Figure 1:
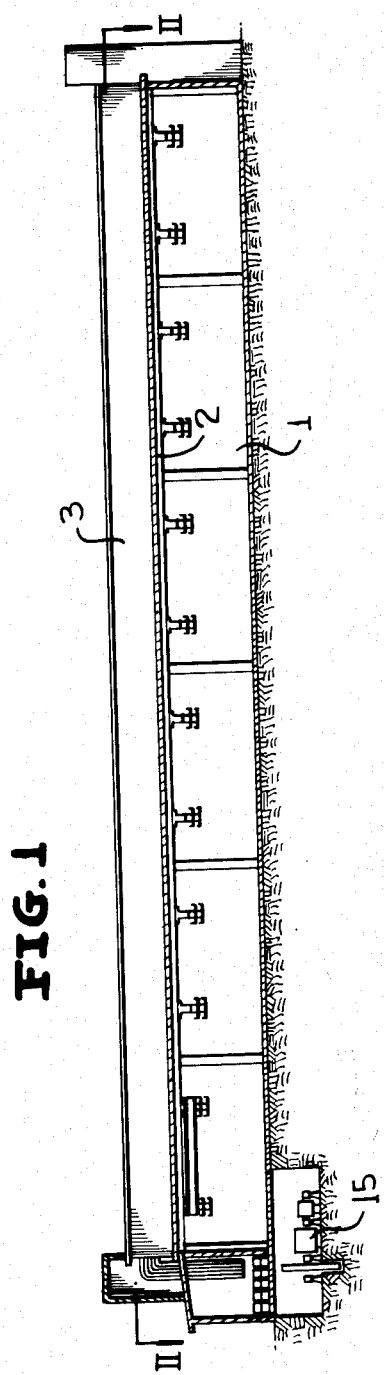

July 14, 1964 I. O. J. DYBECK 3,140,723
DISTRIBUTION PLANTS FOR THE SUPPLY OF POWER MEDIA
Filed Sept. 12, 1960 3 Sheets-Sheet 1

INVENTOR
IVAR OLOF JOSEF DYBECK

BY
ATTORNEYS 3,140,723
DISTRIBUTION PLANTS FOR THE SUPPLY OF POWER MEDIA
Ivar Olof Josef Dybeck, Enkoping, Sweden, assignor to Aktiebolaget Bahco, Stockholm, Sweden, a corporation of Sweden
Filed Sept. 12, 1960, Ser. No. 55,596
3 Claims. (Cl. 137—357)

In addition to ventilation and heating machinery places of work in modern factories and workshops must be supplied with connections for compressed air, hot water, cold water, various kinds of oil, welding gases, electric power at various voltages and pipes and conduits for the removal of used material, such as contaminated air and waste water.

All who work in old factory buildings are well aware of the often unsystematic and temporary measures which must be adopted when machines have to be moved. The consequence has often been broken-up floors and pillars and walls festooned with cables and wires of different kinds.

As a rule, modern industrial buildings are nowadays provided during the building stage with a network of channels in the floor, the main channels being provided with inspection covers and connected by an intermediate system of smaller diameter pipes cast into the floor. This intermediate, or secondary, system is primarily designed for power supply lines but it has not been possible to provide for the incorporation of inflexible pipes. This has meant that the old system, involving pipes running along walls and pillars—often in the form of branches from the main supply line—must be adopted.

An alternative to floor channels which has been adopted in recent years is various types of ceiling systems where the cables or pipes are enclosed in metal ducts and take-off points provided at siutable places on the ducts.

Even though this represents an improvement on the older methods there are still a number of difficulties, especially when the ducts are also used for ventilation and hot-air heating since the supply of various media to the ducts calls for the location of long, power-consuming connections between the ducts and the apparatus and machinery producing these power media.

According to the present invention these difficulties are now overcome in a particularly effective manner in that the distribution network consists of a combination of, on the one hand, a housing placed along part or all of the roof of the premises. This housing contains apparatus for the production of the required media, for example hot air for the heating of the premises and their ventilation and also compressed air and apparatus and pipes for distribution, or even storage. Also the housing provides distribution of other necessities, for example hot water, cold water, various kinds of oil, welding gases and electric power at various voltages and, if required, pipes for the removal of used products, such as contaminated air and waste water. On the other hand the present invention includes a number of distribution beams in the form of closed units, said beams being arranged under the roof of the premises and running at right angles to the housing on the roof of the premises. These beams serving as air ducts and for the attachment of other requisite pipes and/or electric cables, for example on shelves attached to the outside of the distribution beams, and also via connection pipes or cables passing between the housing on the roof and the distribution beams below the roof.

By means of partition walls these distribution beams may suitably be divided into two or more channels so that several media can be simultaneously transported via these beams independently of each other.

In order to permit almost complete freedom of choice as to the location of machines etc., without having to resort to the use of long, suspended or more or less provisional cables, pipes or hoses it is possible, by òne application of the invention, to use not only the distribution beams but, in addition, a number of movable supplementary beams which form shelves or supports for all types of cable or pipe running from the distribution beams. It is also advantageous if these supplementary beam are in the form of closed beams wtih one or more channels.

Figure 2:
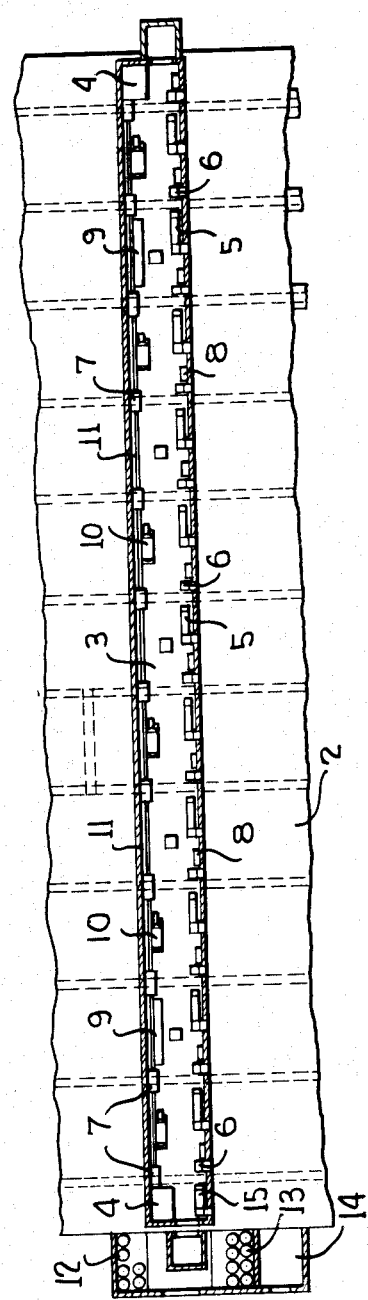
Figure 3:
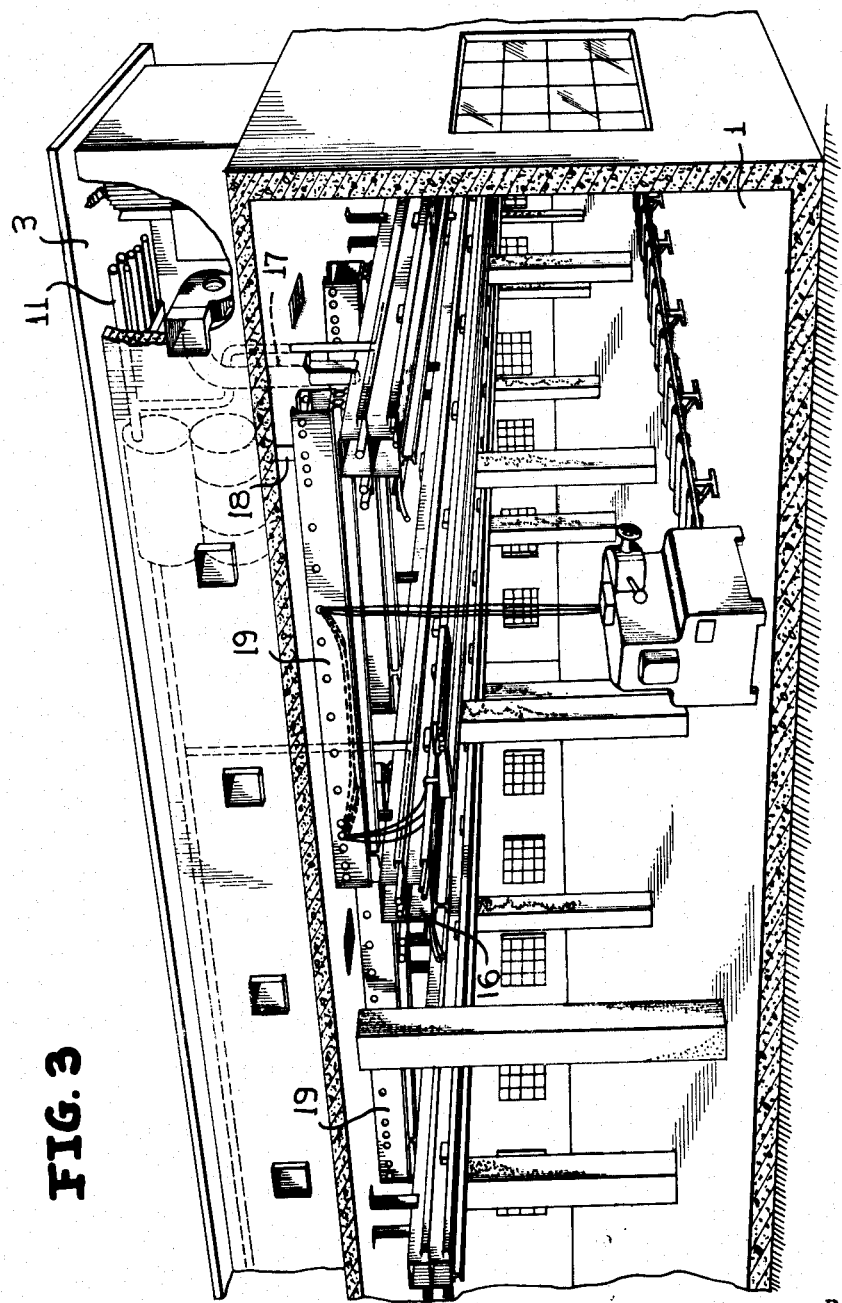
Figure 4:
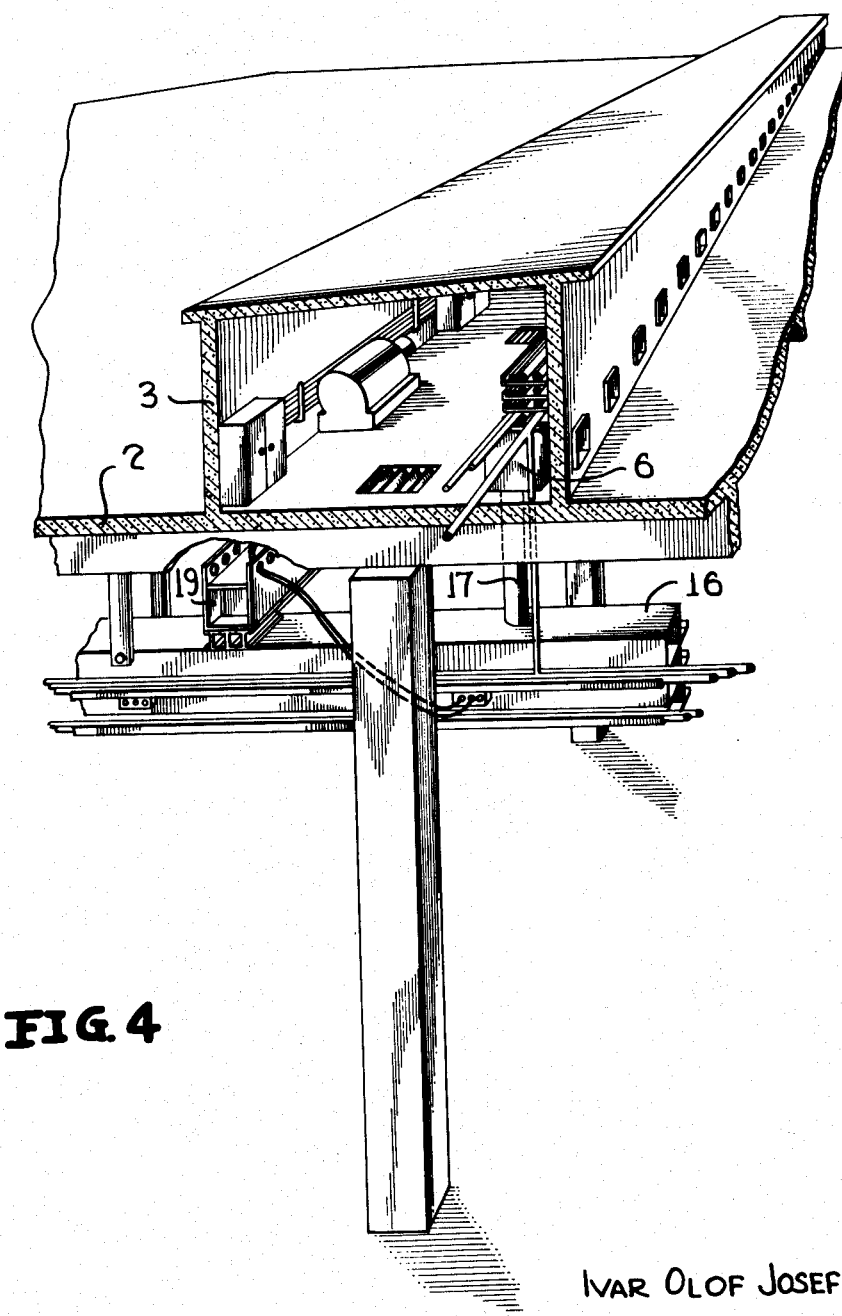

FIG. 1 shows a factory building with the distribution plant according to the invention shown lengthwise, while FIG. 2 shows a horizontal section of the building in plan view along the line II—II in FIG. 1, FIG. 3 shows in perspective one way in which the plant could be installed in a factory building, and FIG. 4 shows part of the plant in perspective.

The factory building is 1 having a roof 2 and a housing 3 on the roof. The housing contains apparatus for the production of power media. Transformer units are designated as 4, 5 are air heaters, 6 designate exhaust fans, 7 refer to junction boxes for electric power, 8 are control panels, 9 constitute time-control units, 10 are compressors and 11 refers to the electric cable system. At one end or side of the building are junction points 12, 13 and 14 for oil, water and gas and, at 15, space for converters etc.

Under the roof of the building and at right angles to the housing 3 running the length of the building are a number of closed distribution beams 16 which, via pipe connections 17, are connected to the housing 3 for connection to the exhaust fans 6.

By means of ducts 18 the distribution beams 16 are provided with warm air for air-conditioning purposes.

All the desired service media can be installed to the desired extent in the distribution beams 16 from the housing 3. The system can be successively extended without difficulty in that the minimum number of supply pipes are installed from the beginning. When the need arises for the supply of a particular medium, the beam is provided with the necessary pipes, cables etc. In addition to the distribution beams 16 use can also be made of the movable supplementary beams 19, arranged at right angles to the distribution beams, these supplementary beams being carried on the beams 16 and forming shelves or supports for all types of cable or pipe running from the distribution beams.

It is good practice to design not only the distribution beams but also the supplementary beams as box beams containing one or more channels.

I claim:
1. A building of the type described comprising a tunnel-like housing disposed on the upper side of the roof, said housing being elongated and of substantially the same length as one of the main dimensions of the building, apparatus and conduits for generating and distribution of different media and electrical cables for the building dis- posed within said housing, distribution beams disposed under the roof at substantially equal locations therealong and capable of serving as ventilation and evacuation ducts, shelf means disposed on said distribution beams for carrying conduits for the different media and electrical cables, means interconnecting said distribution beams and the conduits and electrical cables carried thereby with same of said housing, and means connecting machinery disposed in said building with the distribution media and electrical cables in said distribution beams.

2. A building according to claim 1, wherein said distribution beams are disposed at substantially right angles to said housing.

3. A building according to claim 1, wherein supplementary beams are disposed adjacent said distribution beams and are movable with respect thereto, said means connecting the machinery being disposed thereon.

References Cited in the file of this patent
UNITED STATES PATENTS

| | | |
|---|---|---|
| 235,754 | Durham | Dec. 21, 1880 |
| 316,292 | Rankin | Apr. 21, 1885 |
| 899,224 | Larson | Sept. 22, 1908 |
| 2,037,895 | Gugler | Apr. 21, 1936 |
| 2,446,822 | Grapp | Aug. 10, 1948 |
| 2,951,498 | Carver | Sept. 6, 1960 |
| 2,956,150 | Schwartz et al. | Oct. 11, 1960 |
| 2,992,438 | Nelson et al. | July 18, 1961 |